March 6, 1934. B. GROB ET AL 1,949,742
FILING MACHINE
Filed May 22, 1930
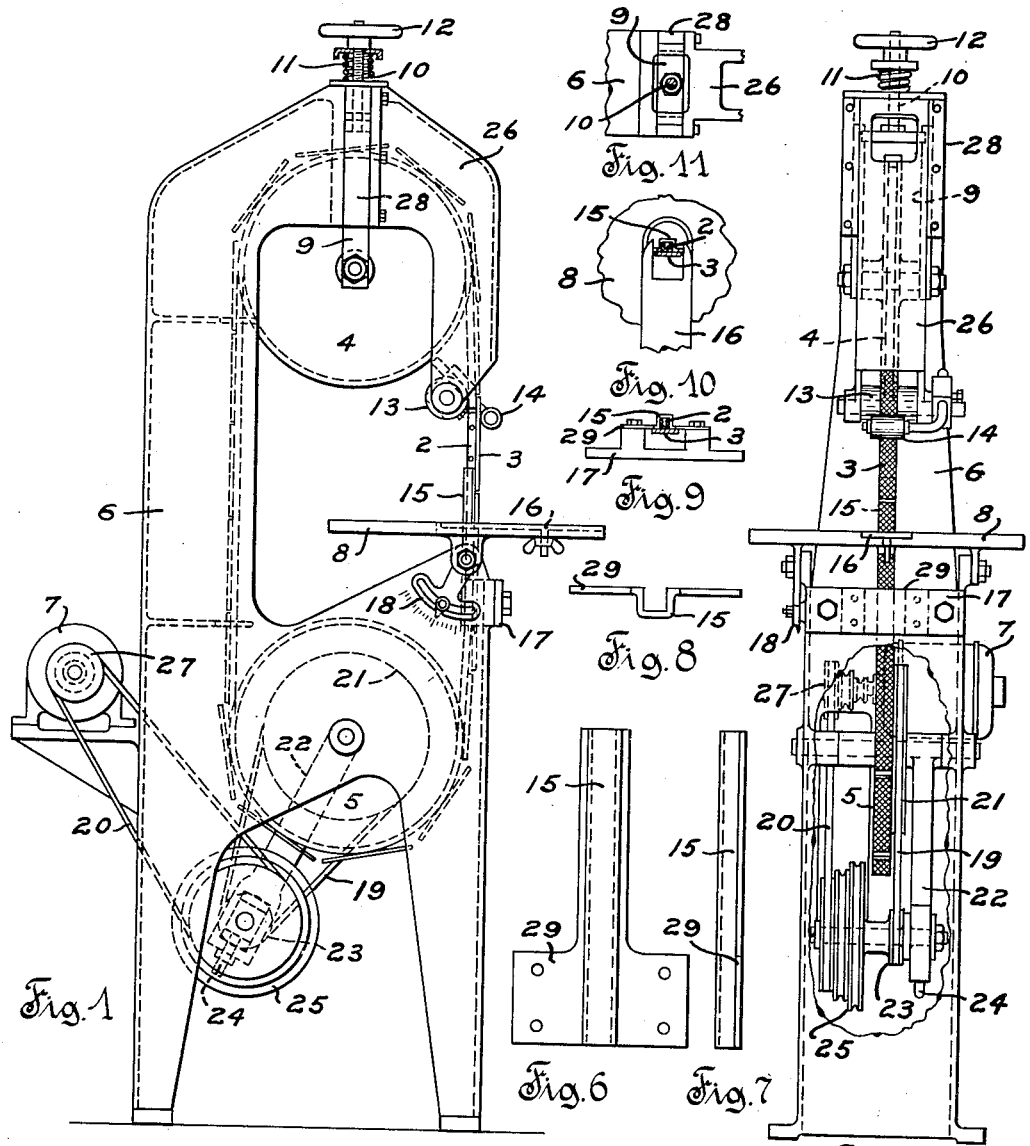
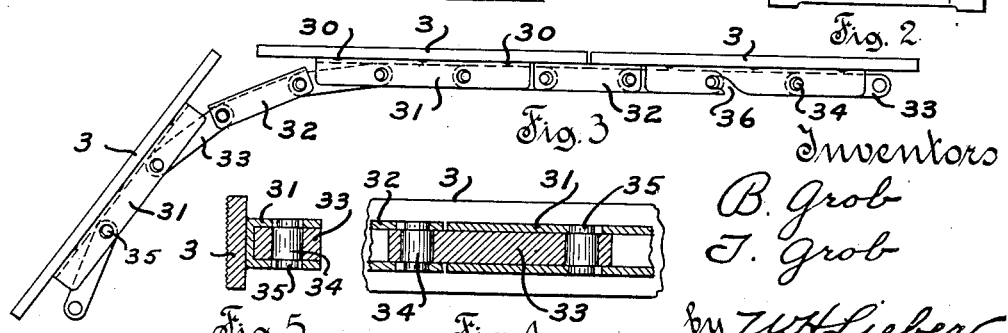
Inventors
B. Grob
J. Grob
by W. H. Lieber
Attorney Patented Mar. 6, 1934

1,949,742

UNITED STATES PATENT OFFICE 1,949,742

FILING MACHINE

Benjamin Grob and Theodore Grob, West Allis, Wis.

Application May 22, 1930, Serial No. 454,593

REISSUED

10 Claims. (Cl. 29—76)

The present invention relates in general to improvements in the art of machine tool manufacture, and relates more specifically to improvements in the construction of power operated abrasion machines of the class ordinarily designated as filing machines.

An object of the invention is to provide an improved abrasion device which is simple and durable in general construction, and which is moreover relatively flexible and highly efficient in operation. Another object of the invention is to provide various improvements in the construction of power operated filing machines or the like, wherein the abrasive or working surfaces are movable in one direction only while engaging the work, and travel at substantially constant speed. A further object of the invention is to provide improvements in the construction of endless file transporting structures for filing machines or the like, and improved mechanism for propelling such transporting structures. Still another object of the invention is to provide improvements in driving mechanisms and work supports for machine tools, and especially for tools wherein the stretch portion of an endless band type of tool carrier is utilized to perform the work intended. Another object of the invention is to provide various improvements in the details of construction and in the mode of operating filing machines or the like, whereby the cost of construction and operation thereof are reduced to a minimum while preserving maximum efficiency. These and other objects and advantages resulting from the use of this invention, will be readily apparent from the following description.

A clear conception of an embodiment of each of the several features of the improvement, and of the mode of manufacturing, of assembling, and of manipulating filing machines built in accordance therewith, may be had by referring to the drawing accompanying and forming a part of this specification in which like reference characters designate the same or similar parts in the several views.

Fig. 1 is a part sectional side elevation of an improved motor driven filing machine.

Fig. 2 is a front view of the improved filing machine, a portion of the frame having been broken away in order to expose internal structure to view.

Fig. 3 is an enlarged side view of a fragment of the endless carrier or chain and several of the files.

Fig. 4 is a similarly enlarged part sectional rear view of a fragment of the chain and one of the files.

Fig. 5 is a similarly enlarged transverse section through the chain and one of the files.

Fig. 6 is a rear view of the file and chain reaction guide.

Fig. 7 is a side view of the file and chain reaction guide shown in Fig. 6.

Fig. 8 is a top view of the reaction guide shown in Figs. 6 and 7.

Fig. 9 is a top view of the reaction guide and of the support therefor, showing the file carrier and one of the files cooperating therewith.

Fig. 10 is a fragmentary top view of a portion of the work supporting table and of the adjustable plate associated therewith.

Fig. 11 is a fragmentary top view of the upper portion of the frame, showing the details of the upper wheel support.

The improved filing machine specifically shown, comprises in general an endless carrier or chain 2; a series of abrasion plates or files 3 rigidly attached to selected links of the chain 2; upper and lower rotary members or wheels 4, 5 respectively providing a support for the chain 2; a main frame 6 supporting the wheels 4, 5 in vertically spaced relation to each other; an electric motor 7 supported upon the rear of the frame 6; and driving mechanism connecting the motor 7 with the lower wheel 5.

The endless carrier or chain 2 is of improved construction as shown in Figs. 3, 4 and 5, consisting of alternate U-shaped sheet metal links 31, 32, and intervening solid links 33 disposed between the side walls of the links 31, 32. The U-shaped sheet metal links 31 are approximately double the length of the links 32, and the successive files 3 are rigidly attached to the successive long links 31 by spot welds 30 or the like. While flat files 3 have been illustrated, these files may obviously be half round, triangular or of any other cross-section. The ends of the solid links 33 and the adjacent portions of the side walls of the U-shaped links 31, 32 are provided with alined drilled holes or openings of equal diameter, and a pivot pin 34 is driven into each set of alined openings. Each of the pivot pins 34 has a medial portion snugly but rotatably fitting the opening of the solid link 33 with which it is associated, and has opposite end portions 35 of reduced diameter, thus forming shoulders at the opposite end portions of the pin 34 the distance between which is slightly less than the distance between the inner surfaces of the side walls of the links 31, 32. The reduced end portion 35 of each pivot pin 34 coacts with the larger opening in the adjacent side wall, and the overall length of each pin 34 is approximately equal to the outside width of the links 31, 32. One of the long U-shaped links 31 may be provided with hook notches 36 in order to permit disconnection and assembly of the endless carrier.

The upper rotary member or wheel 4 is rotatably supported upon vertically adjustable slides 9 movably confined between parallel spacers 28 which are clamped between the main frame 6 and the auxiliary frame 26. The slides 9 are suspended from a threaded adjusting rod 10 the upper end of which has screw thread coaction with a hand wheel 12. A coil spring 11 located between the hand wheel 12 and the upper extremities of the frame 6, 26, functions to resiliently urge the upper wheel 4 away from the lower wheel 5 to thereby properly tension the endless carrier or chain 2.

The lower rotary member or wheel 5 is supported for rotation about a fixed axis at the lower portion of the main frame 6. The wheels 4, 5 are provided with alined circular peripheral grooves within which the chain 2 travels and frictionally engages the wheels, and the tension adjusting mechanism associated with the upper wheel 4 serves to regulate the frictional driving contact. The axes of rotation of the wheels 4, 5 are spaced apart sufficiently to provide a substantially rectilineal stretch of files 3 of considerable length at the front of the machine, this stretch being normally movable downwardly through a central opening in a tiltable work table or support 8. A reaction roller 13 rotatably supported in the lower end of the auxiliary frame 26, engages the rear of the carrier chain 2 as it leaves the upper wheel 4 and is so disposed that the chain 2 is forced forwardly beyond a position of tangency relative to the wheel 4, as it proceeds toward the work support 8. An adjustable guide roller 14 likewise supported upon the lower end of the frame 26, engages the front faces of the successive files 3 and serves to steady the working stretch portion of the machine.

The work table or support 8 is tiltably supported upon the frame 6 some distance below the guide rollers 13, 14, and extends entirely around the working stretch of the endless series of files 3. The support 8 may be locked to the frame 6 in any desired position, and the angle of tilt of the support 8 may be accurately determined with the aid of a segment gage 18. An adjustable plate 16 which is slidably associated with the work support 8, serves to minimize the gap between files 3 and the work supporting surface as the support 8 is tilted. A stationary guide 15 is formed and disposed to simultaneously engage the rear surfaces of both the chain links 31, 32, 33 and those of the files 3 as they enter the working zone, this guide 15 being provided with lateral ears 29 beneath the support 8, by means of which the guide is secured to a transverse plate 17 which is in turn rigidly attached to the forward portion of the frame 6. The guide 15 is formed of sheet metal and is preferably of less transverse width than the files 3 above the support 8 in order to permit the filing of narrow slots and also the inside surfaces of holes in pieces resting upon the support 8, the latter operation being facilitated by the disconnecting hooks 36 of the endless carrier.

The mechanism for transmitting motion from the electric motor 7 to the lower wheel 5 comprises a pair of belt drives one of which is associated directly with the motor 7 and the other of which delivers rotary motion directly to the wheel 5. The initial drive consists of a pair of cone sheaves 27, 25 having several sets of alined grooves providing for several speed variations, and an endless V belt 20 adapted to interchangeably coact with the grooves of the several sets. The driven sheave 25 of the initial drive, is secured to the sheave 23 of the final drive as shown in Fig. 2, both of the sheaves 25, 23 being rotatably supported upon a shaft supported in the lower end of a pivoted arm 22. The sheave 23 is drivingly connected with the sheave 21 secured to the lower wheel 5, by means of a V belt 19, the tension of which is capable of being varied with the aid of adjusting mechanism 24 shown in Figs. 1 and 2. The weight of the arm 22 and the elements carried thereby serves to tension the belt 20 of the initial drive while permitting ready transfer of the belt 20 to any set of the alined grooves in the sheaves 25, 27.

During normal operation of the machine, the motor 7 is operating to drive the wheel 5 at the speed selected, thereby causing the endless series of files 3 to travel in sucession around the wheels 4, 5 and to be presented in rectilineal order above the work table or support 8. Pieces of material resting upon the support 8 may then be pressed against the roughened surfaces of the files 3 which quickly abrade the presented surfaces or projections. Depending upon the position of tilted adjustment of the work table, the files 3 may be caused to cut at any desired angle, and the initial drive also permits movement of the files 3 at three different selected speeds. The guide rollers 13, 14 and the relatively stiff fixed guide 15 permit the pieces to be forced against the filing surfaces with considerable pressure without undesirably deflecting the working stretch of the carrier chain, and the compactness of the guide 15 enables use of the device for a considerable range of purposes. The adjustable plate 16 eliminates danger of having the files 3 carry the piece of material being filed, through the central opening in the table 8, and the improved driving mechanism connecting the motor 7 and the lower wheel 5 besides being readily adjustable to produce efficient driving, is also sufficiently flexible to protect the motor against shock. The hand wheel 12 may be manipulated to properly tension the chain 2 and to eliminate slippage, and the roller 14 may be adjusted to accomodate files of various thickness.

The improved chain structure is not only simple and strong, but may be manufactured at minimum cost and can therefore be discarded when the files 3 are worn out, with relatively small loss. The U-shaped links 31, 32 may be formed with the aid of dies, and the spot welding attachment of the files 3 to the links 31, may be accomplished without damaging the files so as to produce a rigid connection. While the pins 34 are only slipped into position during assembly of the chain and have no end heads, these pins are effectively held against endwise displacement when the chain is under tension. The shoulders on the pins 34 then engage the adjacent inner surfaces of the walls of the U-shaped links 31, 32, and the pins cannot move out of the openings in the intervening links 33. This feature has proven particularly advantageous in commercial use of the invention.

From the foregoing description, it will be apparent that the invention provides a simple and durable filing machine or similar structure, which may be manufactured and operated at minimum cost. The device has proven highly efficient in operation and may be conveniently manipulated to meet a great variety of operating conditions.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:—

1. In combination, a series of files, a series of links supporting said files, said links having overlapping ends provided with alined transverse openings of equal diameter, and pivot pins having medial portions of diameter substantially equal to that of said openings and having end portions of reduced diameter, said pins connecting the successive links of said series to provide an endless file carrier.

2. In combination, a series of files, a U-shaped link secured to each of said files, other links connecting the successive U-shaped links of said series, said other links having ends disposed between the side walls of the corresponding U-shaped links and having transverse openings of the same diameter as alined openings in said side walls, and a pivot pin disposed within each set of said alined openings, each of said pins having portions of reduced diameter coacting with said wall openings.

3. In combination, a series of files, and a carrier chain for said files, said chain comprising adjoining sets of links the end of one of which is disposed between side walls of the other, and which are provided with alined transverse openings of equal diameter at said intervening end and side walls, and a pivot pin disposed within each set of said alined openings, said pin being of length substantially equal to the distance between the outer faces of said walls and having ends of reduced diameter coacting with the openings in said walls.

4. In combination, a series of files, a series of links supporting said files, said links having overlapping ends provided with alined transverse openings of equal diameter, and one-piece pivot pins having integral medial portions of diameter substantially equal to that of said openings and having end portions of reduced diameter, said pins connecting the successive links of said series to provide an endless file carrier.

5. In combination, a series of files, a series of links supporting said files, said links having overlapping ends provided with alined transverse openings of equal diameter, pivot pins having medial portions of diameter substantially equal to that of said openings and having end portions of reduced diameter, said pins connecting the successive links of said series to provide an endless file carrier, and means for maintaining said links under tension to prevent displacement of said pins.

6. In combination, a series of files, a series of links supporting said files, said links having overlapping ends provided with alined transverse openings of equal diameter, pivot pins having medial portions of diameter substantially equal to that of said openings and having end portions of reduced diameter, said pins connecting the successive links of said series to provide an endless file carrier, and resilient means coacting with said chain to prevent displacement of said pins.

7. In combination, a series of files, a series of links supporting said files, said links having overlapping ends provided with alined transverse openings of equal diameter, one-piece pivot pins having integral medial portions of diameter substantially equal to that of said openings and having end portions of reduced diameter, said pins connecting the successive links of said series to provide an endless file, and resilient means coacting with said chain to prevent displacement of said pins.

8. In combination, a series of files, a U-shaped carrier link attached to each of said files, other links connecting the successive carrier links, some of said other links having ends disposed between the side walls of the adjacent carrier links and said files being of considerably greater width than said carrier links and projecting beyond said side walls, and a U-shaped stationary guide having a recess through which said links are movable longitudinally and also having outwardly extending side flanges engageable directly with the rear of said projecting file portions, the guide width across said flanges being less than the corresponding file widths.

9. In combination, a series of files, a U-shaped carrier link attached to each of said files, solid links disposed between successive carrier links and having ends disposed between the side walls of the adjacent carrier links, U-shaped connector links connecting the opposite ends of adjacent solid links, said files being engageable directly with said connector links and having considerably greater width than said U-shaped links and projecting beyond the side walls thereof, and a U-shaped stationary guide having a recess through which said U-shaped links are movable in succession and also having outwardly extending side flanges extending longitudinally thereof and engageable directly with the rear of said projecting file portions, the guide width across said flanges being less than the corresponding file widths.

10. In combination, a series of files each having a U-shaped carrier link attached thereto, U-shaped connector links interposed between the successive carrier links and engageable with the ends of said files, said files projecting laterally a considerable distance beyond all of said U-shaped links, solid links pivotally connecting the adjacent ends of the successive U-shaped links and disposed between the side walls thereof, and a reversely U-shaped stationary guide having a longitudinal recess through which said U-shaped links are successively movable and also having outwardly projecting longitudinal side flanges engageable directly with the rear of said projecting file portions, the guide width across said flanges being less than the corresponding file width.

BENJAMIN GROB.
THEODORE GROB.